(12) United States Patent
Atluri et al.

(10) Patent No.: US 11,799,796 B1
(45) Date of Patent: Oct. 24, 2023

(54) CLOSED LOOP CHANGE MANAGEMENT FOR CLOUD-BASED SYSTEMS

(71) Applicant: Amazon Technologies, Inc., Seattle, WA (US)

(72) Inventors: Gautham Atluri, Seattle, WA (US); Somak Chattopadhyay, Sammamish, WA (US); Soniya Parmar, Seattle, WA (US); Pavan Kumar Adepu, Snohomish, WA (US); Sreeram Krishna Sama, Seattle, WA (US); Jianhua Guo, Bothell, WA (US); Narayanan Lakshmanan, Redmond, WA (US); Adila Sadovic, Berlin (DE)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/661,757

(22) Filed: May 3, 2022

(51) Int. Cl.
| | |
|---|---|
| *G06F 11/34* | (2006.01) |
| *G06F 9/48* | (2006.01) |
| *G06F 9/50* | (2006.01) |
| *H04L 47/762* | (2022.01) |
| *H04L 47/70* | (2022.01) |
| *H04L 47/80* | (2022.01) |
| *H04L 47/78* | (2022.01) |

(52) U.S. Cl.
CPC .......... *H04L 47/762* (2013.01); *H04L 47/781* (2013.01); *H04L 47/803* (2013.01); *H04L 47/828* (2013.01)

(58) Field of Classification Search
CPC ... H04L 47/762; H04L 47/781; H04L 47/803; H04L 47/82
See application file for complete search history.

(56) References Cited

U.S. PATENT DOCUMENTS

| | | | | |
|---|---|---|---|---|
| 2018/0331928 | A1* | 11/2018 | Dave | H04L 67/10 |
| 2019/0379675 | A1* | 12/2019 | Johns | H04L 67/146 |
| 2020/0328941 | A1* | 10/2020 | Feiguine | H04L 41/0895 |
| 2021/0044504 | A1* | 2/2021 | Verma | H04L 67/62 |
| 2021/0304088 | A1* | 9/2021 | Shannon | G06F 9/5011 |
| 2021/0385097 | A1* | 12/2021 | Stuntebeck | H04L 12/1822 |
| 2023/0236585 | A1* | 7/2023 | Anand | G06F 11/362 |
| | | | | 718/100 |

* cited by examiner

*Primary Examiner* — Christopher B Robinson
(74) *Attorney, Agent, or Firm* — Lee & Hayes, P.C.

(57) ABSTRACT

Systems and techniques are disclosed for generating a session identifier to be used when implementing changes in a complex system that facilitates identification and retrieval of data indicating the scope and impact of the changes. An execution identifier for a set of operations and a service identifier for a service performing the operations may be used as a basis for the session identifier. The session identifier may be provided to computing resources on which operations are performed and logged by the computing resources along with the results of the operations. This activity data associated with the particular set of operations can be retrieved using the session identifier to determine the scope and impact of the operations on the system.

20 Claims, 8 Drawing Sheets

CLOSED LOOP CHANGE MANAGEMENT FOR CLOUD-BASED SYSTEMS

BACKGROUND

A service provider may operate multiple geographically diverse data centers that provide various types of computing resources for customers on a permanent and/or an as-needed basis. These computing resources may include data processing resources, data storage resources, networking resources, data communication resources, network services, virtual machine instances, and virtual machine storage services, among others. A customer may operate a system that utilizes many such resources that may interact with one another. As the customer's system requirements change, the number and types of computing resources within the customer's system may fluctuate, as may the interactions between such resources.

The resources associated with a customer system may be initially configured by, or on behalf of, the customer. After initial configuration, the customer may request a change to the system. A system change may require a change to the configurations of one or more computing resources in that system. Configuration changes may be implemented using a change management tool that receives the requested configuration changes from an operator (e.g., the customer, the service provider) and (e.g., automatically) implements the changes across the various computing resources associated with the configuration change. The change management tool may identify the computing resources on which changes are to be made based on the requested configuration changes. While a change management tool may facilitate the implementation of changes across computing resources in a system, due to the complexity of such systems and the variability of the resources that may be associated with such systems at any particular time, it can be challenging to determine the scope and impact of a change to a system and its associated resources.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
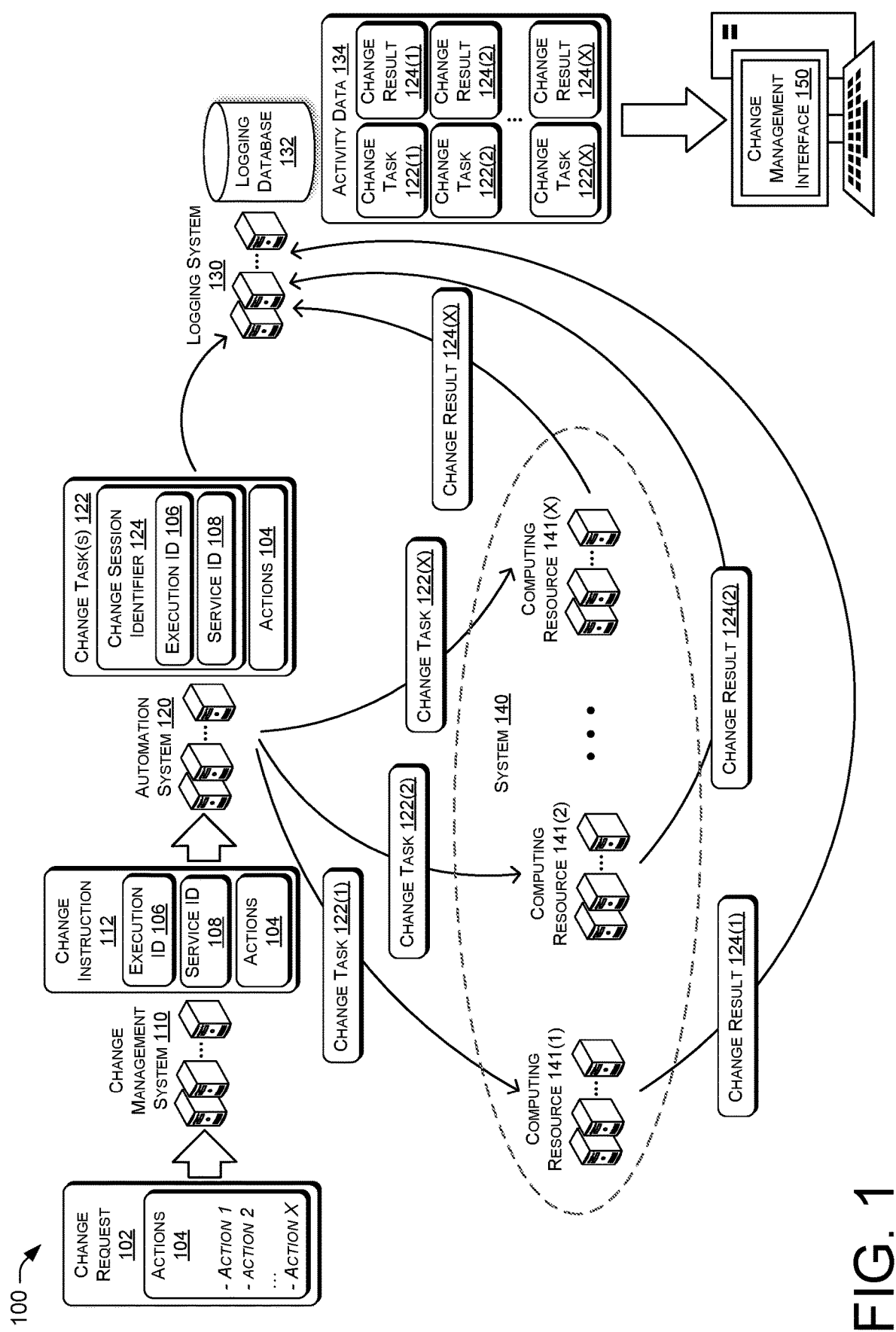
FIG. 1 illustrates a system-architecture diagram of an example environment in which a closed loop change management system may be implemented.

Change management systems may be used to implement changes in a system that utilize multiple resources. For example, a service provider may provide one or more resources for a customer system. The requirements of the system may be provided by the customer to the service provider and may change over time with the customer's needs and goals. The system may include various types of physical and/or logical resources, such as computing resources, data processing resources, data storage resources, networking resources, data communication resources, network services, virtual machine instances, virtual machine storage services, and any other resources that may include one or more computing devices and/or systems. Any such system may be referred to herein as a "computing resources." The service provider may implement such a system using multiple computing resources that may be located across various geographical locations (e.g., in one or more data centers).

A change management system may receive a request from a user (e.g., associated with the customer) to implement a configuration change to a system, referred to as a "change request" or a "system modification request." A configuration change may include one or more changes to a configuration of one or more existing resources in the system, a creation and/or addition of one or more resources to a system, and/or a deletion or removal of one or more resources from a system. A change request may include one or more actions to be performed on the system. These actions may apply to specific (e.g., logical, physical, or virtual) resources and/or entities within or associated with the system that may be implemented using one or more physical computing resources in one or more service provider data centers. For example, a change request may include a request to implement a new table within a system and populate the table with particular data stored by the system. Such a request may involve changes to multiple computing resources, such as data processing resources, data storage resources, and the physical resources supporting such computing resources.

A change management system may obtain or confirm authorization for a submitted change request. This may include generating an authorization request to a system administrator associated with the service provider and/or the customer and receiving a response to the authorization request. If the change request is not authorized, the change management system may not implement the change request and may generate one or more notifications indicating that the change request was denied.

If the change request is authorized, the change management system may generate a change instruction that includes and/or indicates the one or more actions requested in the change request. The change management system may transmit this instruction to an automation system for implementation. The automation system may determine the particular resources to be configured to implement the actions associated with the change request. The automation system may also, or instead determine the particular instructions to provide to such resources in order to alter the configurations of the resources to implement the actions.

In order to instruct various resources to perform the actions associated with a change request, the automation system may user an identifier associated with the communications session that that automation system may use to provide instructions to each such resource. While such a session identifier may be associated with a particular identity and access management (IAM) role commonly assigned to users, because implementing a change request is typically performed by an automated service and performed one time (e.g., not typically repeated), the automation system may generate a random identifier to use for a session identifier. For example, the automation system may generate a random universally unique identifier (UUID) to use as a session identifier for the change request generally, for the individual resources of the one or more resources to be configured to implement the change request, and/or for the individual actions of the one or more actions to be performed on the one or more resources. The automation system may use this random session identifier to configure various resources based on the change request.

The various resources associated with a complex system may be implemented across various computing resources and data centers. The scope of such resources may also vary over time. Therefore, the particular resources affected by a change request may be challenging to determine after the implementation of the actions associated with the change request. Even when changes to resources are (e.g., centrally) logged, the challenge of determining the impact of a particular change is compounded by the use of a random identifier for each change request and/or the actions associated with the change request. This may be at least in part because it may be difficult to determine the source of a logged action if the associated session identifier is randomly generated and unlikely to be used again.

In various embodiments, a change management system and/or an automation system may define a session identifier that can be used to identify a particular change request and/or actions associated therewith, thereby facilitating an improved determination of the scope and impact of a particular change on a system. A change management system may receive a change request from a user and, based on determining that the change request is authorized, may generate a change instruction that includes one or more actions associated with the change request. The change management system may transmit this change instruction to an automation system for implementation across the applicable resources.

Based on the change instruction, the automation system may generate a change session identifier for use with implementing the actions in the change instruction. In various embodiments, the automation system may generate this change session identifier based on an identifier associated with the change instruction and an identifier based on the change management service associated with the change management system that issued the change instruction.

In complex systems, a set of one or more operations may be assigned to, or otherwise associated with, a particular execution identifier. An execution identifier may be associated with a workflow, process, or other set of operations to be executed. In such systems, a particular service that performs one or more particular types of operations may be assigned to, or otherwise associated with, a particular service identifier. In various embodiments, an automation service may generate a session identifier by appending an execution identifier to a service identifier, to generate a session identifier such as "<ServiceId>-<ExecutionId>," where "<ServiceId>" may indicate the service associated with or performing the set of one or more operations, while "<ExecutionId>" may indicate the particular execution identifier for the set of one or more operations. In the change request example, the automation service may generate a change session identifier such "ChangeRequest-<ExecutionId>," where "ChangeRequest" may indicate the change management service that issued the change instruction, while "<ExecutionId>" may indicate the particular execution identifier for the change instruction.

In various embodiments, the automation system may generate a session identifier for use with implementing actions associated with services, systems, and/or operations other than a change instruction issued by a change management service. For example, the automation system may be configured to generate (e.g., automatically, periodically, etc.) a set of one or more actions or operations that it may be configured to implement across various resources in a system. In this example, the automation system may generate a session identifier based on an identifier associated with the set of one or more actions or operations and an identifier based on its automation service. In this example, the automation service may generate a session identifier such "Automation-<ExecutionId>," where "Automation" may indicate the automation service associated with the automation system and/or that generated the set of one or more actions or operations, while "<ExecutionId>" may indicate the particular execution identifier for the set of one or more actions or operations. In various other embodiments, one or more other services or systems may transmit or otherwise instruct the automation system to implement and/or execute one or more actions or operations. In such embodiments, the automation system may generate one or more session identifiers as described herein to facilitate determining the scope and impact of performing the associated one or more actions or operations.

Using such a session identifier based on the service identifier and the execution identifier, the automation system may perform one or more operations involving one or more resources. For example, continuing with the change request example, an automation system may use a change session identifier to perform the one or more actions indicated in a received change instruction from a change management system and/or associated with a change request. For instance, the automation system may issue one or more application programming interface (API) calls to one or more resources requesting the performance of one or more operations on the resources. The automation system may include the change session identifier with each such API call. Similarly, in other embodiments, the automation system may include a session identifier as described herein with API calls to perform operations that are not related to change management (e.g., automation system generation operations, operations based on instructions received from one or more other system or services, etc.). Note that any other techniques for implementing operations on resources of any type may be used with the disclosed embodiments other than, or in addition to, API calls, and all such embodiments are contemplated as within the scope of the instant disclosure.

In various embodiments, operations performed by the automation system may be logged for future use, such as, but not limited to, determining the impact and scope of actions performed based on a change request. For example, the automation system may transmit data representative of the operations performed (e.g., instructions sent to resources to perform one or more actions) to one or more logging systems. This data may include the session identifier associated with the operations (e.g., change session identifier). Alternatively, or in addition, the resources instructed by the automation system to perform one or more actions may transmit data representative of the actions performed, including the associated session identifier (e.g., change session identifier) to one or more logging systems. The data provided to one or more logging systems by an automation system and/or a resource may include, in addition to a session identifier, indicators of one or more of an action initiated, a result of the action initiation (e.g., success, failure, error status, complete, incomplete, etc.), a date and/or time of initiation of the action, the resource on which the action was initiated, and any other information that may be suitable to associate with an action initiated on a resource. Where data may be received at a logging system from both an automation system and one or more resources to which the automation system has provided an instruction to perform an action, the logging system may correlate and associate the data from the automation system and one or more resources to generate a record for a particular action. For example, the logging system may associate data from the automation system indicating that the automation system sent a particular instruction to a particular resource to perform an action with data from that particular resource indicating that the resource received the instruction and that the instructed action was successfully completed.

In various embodiments, the information stored in one or more logging systems that may be associated with a session identifier may be used to determine the scope and impact of a particular operation associated with that identifier. For example, information stored in one or more logging systems that may be associated with a change session identifier may be used to determine the scope and impact of a particular change request and/or change instruction associated with that identifier.

In various examples, a change management system may provide or otherwise be associated with a change management interface that may allow a user to select or otherwise indicate a particular change request and/or change instruction. The change management system may, based on the indicated change request and/or instruction, determine the change session identifier for that change request and/or instruction based on a service identifier and an execution identifier. For example, the change management system may determine that an indicated change request is associated with a particular execution identifier and that the change management service associated with the change management system is associated with a particular service identifier. The change management system may generate the change session identifier for the change request using this service identifier and execution identifier (e.g., by appending the execution identifier to the service identifier).

Using this change session identifier, the change management system may query one or more logging systems that may be configured to store action data for an automation system and/or one or more resources to retrieve data associated with the change session identifier. This query may be performed using one or more structured query language (SQL) database queries and/or similar queries, or any other suitable data retrieval methods. The change management system may present the retrieved data to the user on, for example, the change management interface. The change management system may also perform one or more operations on the retrieved data to generate additional data for, for example, presentation to the user. Such additional data may include, but is not limited to, determining trends, impact locations, affected resources, traffic levels, etc.

In various embodiments using information stored in one or more logging systems that may be associated with operations other than changes, a session identifier may again be used to determine the scope and impact of a particular operation associated with that identifier. For example, other types of systems may also provide one or more interfaces that may allow a user to select or otherwise indicate a particular operation and/or set of instructions. Such systems may, based on the indicated operation and/or set of instructions, determine the session identifier for that operation and/or set of instructions based on a service identifier and an execution identifier (e.g., by appending the execution identifier to the service identifier). Using this session identifier, Such systems may query one or more logging systems that may be configured to store action data for a system associated with the service identifier and/or one or more resources to retrieve data associated with the session identifier. Here again, this query may be performing using one or more SQL database queries and/or similar queries, or any other suitable data retrieval methods. Such systems may present the retrieved data to the user on, for example, one or more interfaces. Such systems may also perform one or more operations on the retrieved data to generate additional data for, for example, presentation to the user. Such additional data may include, but is not limited to, determining trends, impact locations, affected resources, traffic levels, etc.

The techniques and systems described herein may be implemented in a number of ways. Example implementations are provided below with reference to the following figures.

FIG. 1 is a block diagram of an illustrative environment 100 that includes a change management system 110, an automation system 120, and a logging system 130. The environment 100 may also include a change management interface that may facilitate user interaction with the logging system 130, the change management system 110, and/or the automation system 120. The environment 100 may further include a system 140 that may be a customer system provided and/or implemented by a service provider. The system 140 may include one or more of computing resources 141(1)-(X) that may each represent one or more physical and/or logical resources, such as one or more server computers, virtual machines, software resources, databases, notebooks clusters, datasets, etc., or any combination thereof.

The change management system 110 may be configured to receive and determine authorization status for one or more change requests associated with a system, such as change request 102. The change request 102 may include data indicating actions 104 that may be one or more actions (e.g., Action 1, Action 2 . . . Action X) to be taken in the system 140 and requested by the submitter of the change request 102. Such actions may be any one or more actions that may be performed on a resource (e.g., adding a table, populating a table with data, deleting a table, etc.). Various other parameters may also be included in the change request 102, such as an identifier of the system 140, one or more usernames and/or roles associated with the submitter of the change request 102, a time and/or date of requested implementation of the change, etc.

If the change management system 110 determines that the change request 102 is authorized, the change management system 110 may generate a change instruction 112 based on the authorized change request 102. The change instruction 112 may include the one or more actions 104 indicated in the change request 102. In various embodiments, the change management system 110 may also configure the change instruction 112 to include an execution identifier 106 associated with the change instruction 112 and/or the one or more actions 104 and a service identifier 108 associated with the change management system 110 and/or a change management service associated with the change management system 110. The change management system 110 may transmit the change instruction 112 to the automation system 120 for application to one or more resources associated with the system 140.

The automation system 120 may determine the particular resources to be configured to implement the actions associated with the change instructions 112. The automation system 120 may also, or instead determine the particular instructions to provide to such resources. For example, the automation system 120 may determine that the change instruction 112 is associated with the system 140 and that one or more of the actions 104 are to be performed on the computing resources 141(1)-(X).

The automation system 120 may generate, determine, and/or define a session identifier 124 to be used in applying the actions 104 to the computing resources 141(1)-(X). In various embodiments, the automation system 120 may determine the session identifier using the service identifier 108 and the execution identifier 106 received in the change instruction 112. For example, the automation system 120 may determine this session identifier appending the execution identifier 106 to the service identifier 108 to generate a session identifier 124 (e.g., "Service identifier 108-Execution identifier 106").

Based on the determined session identifier 124, the automation system 120 may generate one or more change tasks 122 that may include the session identifier 124 and one or more of the actions 104. The automation system 120 may transmit the changes task(s) 122 to the computing resources 141(1)-(X) to or otherwise implement one or more of the actions 104. In various embodiments, the automation system 120 may transmit an instruction to the individual computing resource to be configured based on the change request 102. For example, the automation system 120 may transmit change task 122(1) to computing resource 141(1), change task 122(2) to computing resource 141(2), change task 122(X) to computing resource 141(X) and so forth. In some embodiments, one or more of the individual change tasks of the change task(s) 122 may be tailored or otherwise configured specifically for an individual computing resource. For example, the individual change task 122(1) for computing resource 141(1) may include a subset of the actions 104 that differs from the subset of actions 104 included in the individual change task 122(2) for computing resource 141 (2). In other embodiments, one or more of the individual change tasks of the change task(s) 122 may be substantially similar (e.g., other than destination addresses for the recipient computing resources). In still other embodiments, the change task(s) 122 may be broadcast to a plurality of computing resources in the system 140 that may individually determine whether and how to execute the actions 104 that may be included in the change task(s) 122. The change task(s) 122 may take the form of one or more API calls and/or may take any alternative form that is suitable for initiating one or more actions on one or more computing resources.

The automation system 120 may transmit data indicating the issuance of the change task(s) 122 to the computing resources 141(1)-(X) to the logging system 130, which may store such data at a logging database 132. This data may include the session identifier 124, one or more of the actions 104, one or more of the computing resources 141(1)-(X) to which the change task(s) 122 was transmitted, and/or any other data that may be associated with a change request, change task, system, computing resource, operation, action, etc. In various embodiments, the automation system 120 may receive responsive data from one or more of the computing resources 141(1)-(X). This responsive data may include an indication of the success or failure of one or more of the actions instructed on the change task(s) 122 and/or related data (e.g., error codes). The automation system 120 may also, or instead, transmit this responsive data and/or data determined based thereon to the logging system 130. Note that in various embodiments, the automation system 120 may not transmit data to the logging system 130, but rather the logging system 130 may collect data from the individual computing resources affected by a change or other set of operations or actions.

The one or more computing resources 141(1)-(X) may, based on receiving respective change task(s) 122, initiate (or attempt to initiate) the actions 104 indicated in their respective change task(s) 122. The one or more computing resources 141(1)-(X) may transmit data as change results 124 to the logging system 130 indicating the receipt of the change task(s) 122 and/or data associated with the change task(s) 122. For example, one or more of the computing resources 141(1)-(X) may transmit data indicating one or more actions initiated or attempted on the respective computing resource, the success or failure of such attempts, the results of the action(s), error codes associated with the action(s), a date and/or time of action initiation or attempt, a date and/or time of action completion or failure, a session identifier (e.g., session identifier 124), a computing resource identifier, and/or any other data that may be associated with an action attempted or initiated on a computing resource. In the example of FIG. 1, the computing resource 141(1) may transmit the change results 124(1) to the logging system 130, the computing resource 141(2) may transmit the change results 124(2) to the logging system 130, the computing resources 141(X) may transmit the change results 124(X) to the logging system 130, and so forth. Note that in various embodiments, the computing resources 141(1)-(X) may not transit data to the logging system 130, but rather the logging system 130 may collect data from the automation system 120 that may serve as a central collection point for data reflecting computing resources affected by a change or other set of operations or actions.

In various embodiments, the logging system 130 may receive data from both the automation system 120 and one or more of the computing resources 141(1)-(X). The logging system may correlate and associate the data from the automation system 130 and the one or more of the computing resources 141(1)-(X) to generate one or more records for a particular action and/or computing resource. For example, the logging system may correlate and associate data from the automation system 120 indicating that the automation system 120 sent the change task 122(1) to the computing resource 141(1) instructing the computing resource 141(1) to perform one or more of actions 104 with data from the computing resource 141(1) indicating that the computing resource 141(1) received the change task 122(1) and that the one or more of actions 104 were successfully completed.

The change management system 110 and/or one or more other systems may generate a change management interface 150 providing a means of retrieving the logging data from the logging database 132 via the logging system 130 for a particular change, such as that associated with the change request 102. Using the change management interface 150, a user may provide an indication of the change request 102. The change management system 110 (or one or more other systems supporting the change management interface 150) may determine the execution identifier 106 associated with the change instruction 112 and the service identifier 108 associated with the change management service associated with the change instruction 112. The system may determine the session identifier 124 based on the execution identifier 106 and the service identifier 108. The system may then query the logging system 130 for records associated with the session identifier 124.

In response to such a query the logging system may reply with activity data 134 associated with the session identifier 124, such as one or more of the change tasks 122(1)-(X) (each of which may include or otherwise be associated with the session identifier 124), one or more of the change results 124(1)-(X) (each of which may include or otherwise be associated with the session identifier 124), other computing resource configuration modification or change data, and/or data associated therewith. The data received in response to this query may be presented to the user in the change management interface 150. In various embodiments, this activity data 134 may be processed using one or more methods to generate aggregated data, representative data, trend data, etc. Based on the activity data 134 retrieved using the session identifier 124, a user may more readily determine the scope and impact of the configuration changes resulting from the change request 102.

An illustrative example will now be described in reference to FIG. 1. A user (e.g., customer, operation, administrator, etc.) may generate the change request 102 to add a database table to a database of the system 140. The user may indicate the actions 104 in the change request 102, which may include the actions of generating, labeling, and populating a new database table associated with a particular type of data on the database. The database may be implemented across various database resources of the system 140. The change management system 110 may determine whether the change request 102 is authorized based on one or more criteria that may be associated with the change request 102 (e.g., user permissions, change request source system and/or network, system 140 permissions, etc.). If the change management system 110 determines that the change request 102 is not authorized, the change management system 110 may take no actions to implement the change request 102 and may, in various examples, generate one or more notifications indicating the denial of the change request 102.

If the change management system 110 determines that the change request 102 is authorized, a change management service associated with the change management system 110 may, based on the change request 102, generate the change instruction 112 that includes the database table actions 104. The change management service may also include in the change instruction 112 the execution identifier 106 that may be associated with the workflow or process associated with the change request 102 (e.g., a change request workflow) and/or the actions 104. The change management service may also include in the change instruction 112 the service identifier 106 that may be associated with the change management service.

The change management system 110 may transmit the change instruction 112 to the automation system 120. Based on receiving the change instruction 112, the automation system may determine the database resources that implement the database and/or store the particular type of data indicated in the actions 104 and/or the change instruction 112. For example, the automation system 120 may determine that the computing resources 141(1)-(X) are database resources used to implement the database. The automation system 120 may generate a session identifier 124 to be used for providing instructions to the computing resources 141(1)-(X) based on the execution identifier 106 and the service identifier 108 included in the change instruction 112. For example, the automation system 120 may generate the session identifier 124 by appending the execution identifier 106 to the service identifier 108. The automation system 120 may generate one or more change task(s) 122 that include the session identifier 124 and the database table actions 104.

The automation system 120 may transmit the change task(s) 122 to the computing resources 141(1)-(X) (e.g., transmit change task 122(1) to computing resource 141(1), transmit change task 122(2) to computing resource 141(2), transmit change task 122(X) to computing resource 141(X)). In various embodiments, the change task(s) 122 may be transmitted to the computing resources 141(1)-(X) via API calls to the computing resources. The automation system 130 may also transmit, to the logging system 130, data indicating the transmission of the changes task(s) 122 to the computing resources 141(1)-(X). The logging system 130 may store this data in the logging database 132.

Based on receiving the change task(s) 122, the computing resources 141(1)-(X) may attempt to initiate the database table actions 104 included in their respective change tasks. For example, the individual computing resources 141(1)-(X) may initiate one or more operations to create the new database table, label the table, and populate the table as indicated in the actions 104. The computing resources 141(1)-(X) may generate change results 124(1)-(X) that include data based on the results of the attempts to perform these actions. The individual change results 124(1)-(X) may include the session identifier 124 that was received in the respective change task(s) 122(1)-(X). For example, the computing resource 141(1) may successfully create, label, and populate a new database table based on the actions 104 and may generate change results 124(1) that indicates the actions 104 were performed successfully. The computing resource 141(2) may successfully create and label a new database table based on the actions 104 but may fail to populate the new database table. The computing resource 141(2) may generate change results 124(2) that indicates that some of the actions 104 were performed successfully (the table creation and labeling actions) while one or more others were not (the table population action). The change results 124(2) may also include one or more error codes associated with the failed actions. The computing resources 141(1)-(X) may transmit the change results 124(1)-(X) based on their respective attempts to perform the database table actions 104 to the logging system 130 for storage in the logging database 132.

A user may submit a request for change impact and scope data associated with the change request 102 and resulting from the database table actions 104 that were initiated at the computing resources 141(1)-(X). For example, a user may interact with the change management interface 150 provided by the change management system 110 to provide an indication of the change request 102. The change management system 110 and/or the interface 150 may determine the execution identifier 106 associated with the workflow or process associated with the change request 102 and the service identifier 108 associated with the change management service that processed the change request 102. Using these identifiers, the change management system 110 may determine the session identifier 124. The change management system 110 may generate a query that includes the session identifier 124 to retrieve the activity data 134 associated with the various change tasks 122 and/or change results 124. The change management system 110 may present the activity data 134 to the user and/or generate data for presentation to the user based on the activity data 134. The data presented may allow the user to readily assess the impact of the new database table creation, labeling, and population requested in the change request 102 to the affected computing resources in the system 140.

The systems and methods described herein may be faster, more efficient, and more robust than conventional systems and methods, as they may facilitate efficient computing resource modification data storage, correlation, and retrieval by reducing the processing and memory resources required to determine particular computing resources affected by a change request or other set of operations. That is, the systems and methods described herein provide a technological improvement over existing change impact determination processes that involve manually searching change logs and correlating change data, computing resources, and change requests, increasing the speed and efficiently of such operations. Moreover, the systems and methods described herein provide a significant data accuracy improvement because the modification data, computing resources, and particular change requests are correlated by a session identifier that is based on an execution identifier associated with the resource modification workflow associated with a particular change request and a service identifier associated with a service implementing the particular change request, eliminating the false correlation of data not associated with the particular change request while capturing the data that is associated with the particular change request.

By associating a single, meaningful session identifier with resource modification actions and results and using that identifier to log the actions and results of a change request, processing requirements for requests for data associated with a change request are reduced because a (e.g., single) query using the identifier may be used to identify and retrieve data associated with the change request. According, fewer storage resources are required to store the data associated with a change request due to the use of the session identifier, and fewer network resources are needed to transmit and receive such data.

FIGS. 2-5 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 2:
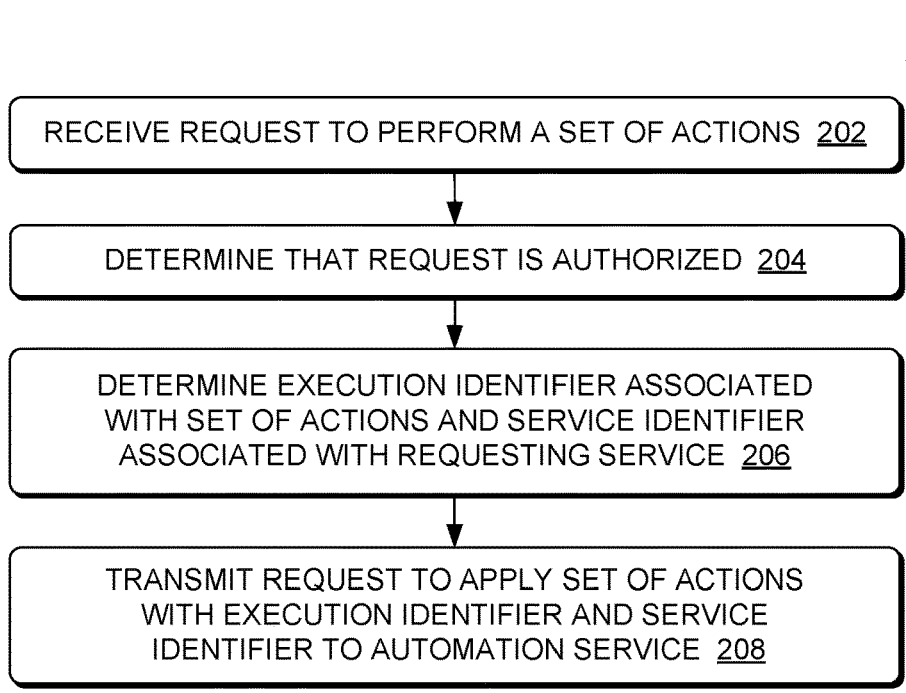
FIG. 2 illustrates a flow diagram of an example method for generating a request to an automation service based on a request to perform a set of actions.

FIG. 2 is a flow diagram of an illustrative process 200 to generate a request to apply a set of one or more actions in a system involving one or more computing resources. The process 200 may be described at times with reference to the environment 100 and may be performed by the change management system 110, but the process 200 may also, or instead, be performed in other similar and/or different environments by other similar and/or different systems.

At 202, a request to perform a set of actions may be received at a management system. In some examples, as described in detail herein, this may be a change request such as the change request 102 that includes the actions 104 and may be received by a change management system such as the change management system 110. In other examples, the request received at 202 may be any type of request to perform any one or more actions of any type within a system that may be composed of one or more computing resources of any type.

At 204, the management system may determine that the request received at 202 is authorized. If the system determines that a request is not authorized, the system may take no action on the request and/or may generate a notification that an unauthorized request has been detected.

At 206, the management system, based on determining that the request to perform the set of actions is authorized, may determine an execution identifier associated with the set of actions. For example, the request received at 202 may include an execution identifier, for example, associated with the system or process that originated or forwarded the request. Alternatively, or in addition, the management system may generate a (e.g., persistent) execution identifier in response to or otherwise based on receiving the request that may be used to identify the one or more processes that may be performed in response to the request. Other sources and means of determining an execution identifier associated with a set of actions or operations are contemplated as within the scope of the instant disclosure.

Further at 206, the management system may determine a service identifier associated with a service associated with the set of actions. This service may be associated with the management system itself or may be a distinct service associated with one or more other systems. For example, the request received at 202 may be received by, directed to, or otherwise handled by a change management service (e.g., associated with the change management system 110). In such an example, the change management system 110 may assign an identifier of its own change management service as the service identifier. In other examples, the management system may receive a (e.g., requested) service identifier with the request received at 202. In other examples, the management system may not assign or determine a service identifier, delegating the service identifier determination to another system (e.g., the system that will generate instructions to computing resources to perform the set of actions).

At 208, the management system may transmit a request to an automation system to generate instructions that cause one or more computing resources to perform the set of actions. This request may include the execution identifier and/or the service identifier.

Figure 3:
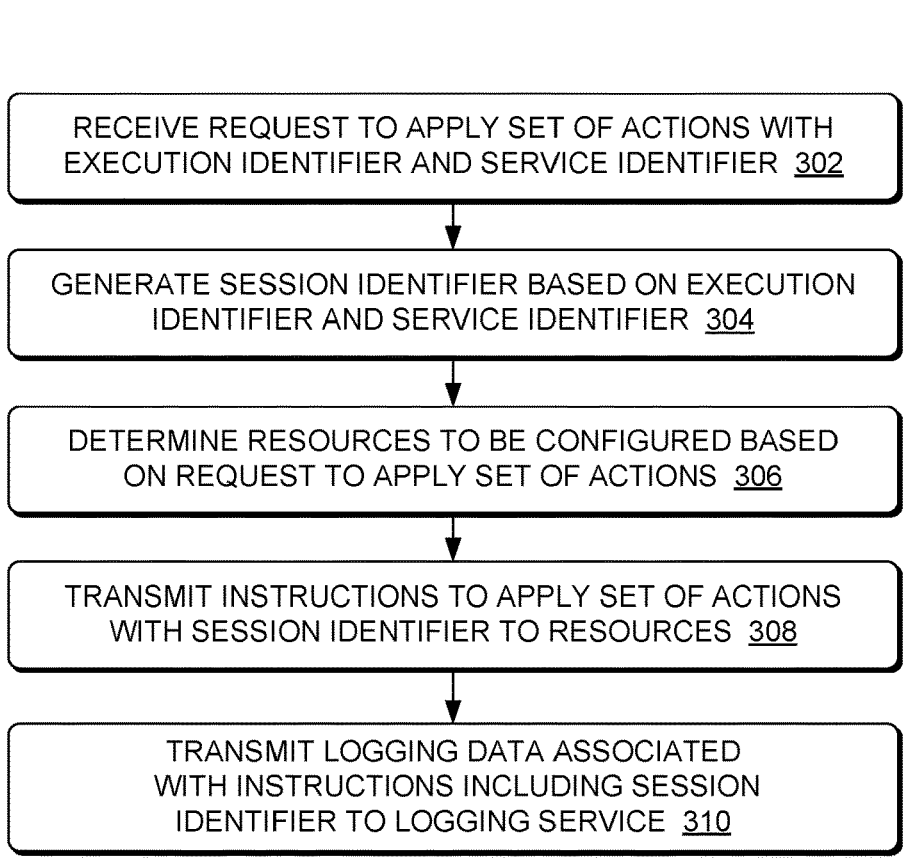
FIG. 3 illustrates a flow diagram of an example method for generating a session identifier and instructions to perform a set of actions.

FIG. 3 is a flow diagram of an illustrative process 300 to determine a session identifier based on a service identifier and an execution identifier and transmit instructions to one or more computing resources with the session identifier to perform a set of actions. The process 300 may be described at times with reference to the environment 100 and may be performed by the automation system 120, but the process 300 may also, or instead, be performed in other similar and/or different environments by other similar and/or different systems.

At 302, an automation system may receive a request to apply or otherwise perform a set of actions at one or more computing resources. In various embodiments, this request may include a service identifier and an execution identifier, for example, when the request is a change instruction request, such as change instruction request 112. In other examples, the automation system may generate the request and/or the set of actions and may therefore also determine a service identifier and an execution identifier at 302. In other examples, this request may include an execution identifier but not a service identifier. In such examples, the automation system may determine a service identifier.

At 304, the automation system may generate a session identifier for use in instructing computing resources to perform the set of actions and/or for use in logging data associated with the set of actions. As described herein, the automation system may append the execution identifier to the service identifier to determine the session identifier. Alternatively, the automation system may determine the session identifier using other means, such as generating an encoded or encrypted session identifier using one or both of the service identifier and the execution identifier. In other examples, the session identifier may be included with the request received at 302.

At 306, the automation system may determine the one or more particular computing resources that may be associated with the set of actions. For example, based on the set of actions, the automation system may determine the computing resources on which such actions are to be performed. For instance, if the actions include creating a database table that includes data of a particular type, the automation system may determine the particular database resources that store that particular data type as target resources for performing one or more of the set of actions. The automation system may also determine the particular actions to be performed on such resources. For example, the automation system may determine to instruct database resources to perform table creation actions but not to perform graphical user interface (GUI) creation actions because GUIs may be generated on other types of resources in the applicable system.

At 308, the automation system may transmit one or more instructions to one or more computing resources (e.g., as determined at 306) to perform one or more of the set of actions. These instructions may include the session identifier determined at 304. These instructions may take the form of API calls and/or any other means of instructing computing resources.

At 310, the automation system may transmit logging data associated with the instructions to a logging system. For example, the automation system may send data indicating the particular computing resources to which the instructions were sent, the actions indicated in the instructions, the time and/or data of transmission, the session identifier, and/or any other data that may be associated with such instructions. In various examples, the automation system may receive responsive data from the computing resources to which it has transmitted instructions (e.g., indicating success, failure, status, error codes, etc.). In such examples, the automation system may also, or instead, transmit such response data and/or data based therein to the logging system.

Figure 4:
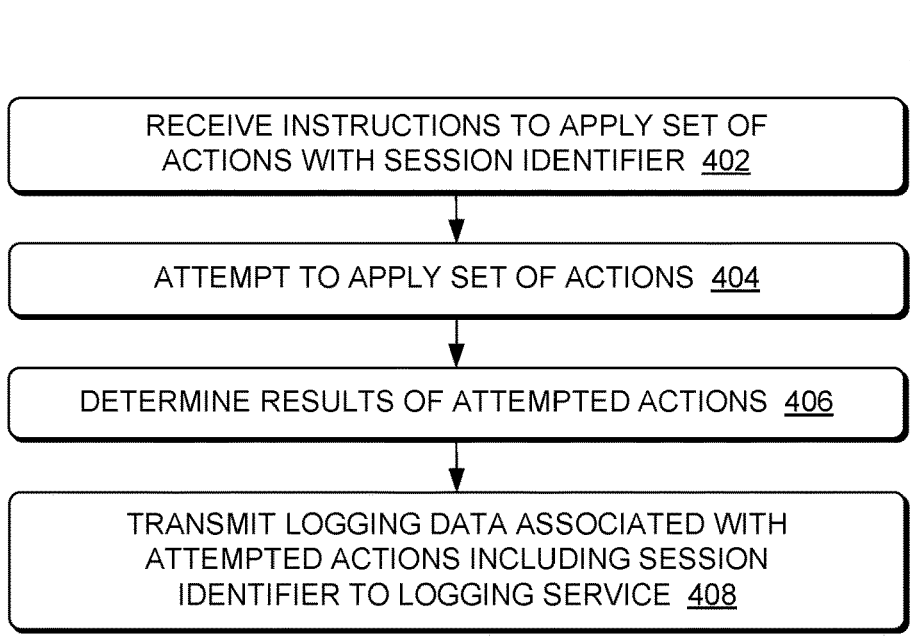
FIG. 4 illustrates a flow diagram of an example method for perform a set of actions at a computing resource in response to instruction from an automation service.

FIG. 4 is a flow diagram of an illustrative process 400 to perform one or more actions at a computing resources and to log data associated with such actions. The process 400 may be described at times with reference to the environment 100 and may be performed by one or more of the computing resources 141(1)-(X), but the process 400 may also, or instead, be performed in other similar and/or different environments by other similar and/or different systems.

At 402 a computing resource may receive instructions to apply or otherwise perform one or more actions. These instructions may include a session identifier. For example, the individual computing resources 141(1)-(X) may receive, in the respective change tasks 122(1)-(X), instructions to perform one or more of the actions 104 and the session identifier 124.

At 404, the computing resources may attempt to perform the set of actions received at 402. At 406, the computing resource may determine the results of the attempt. For example, the computing resource may attempt to generate a new database table. If the attempt is successful, the computing resource may store an indication of this success. Alternatively, if the attempt us unsuccessful, the computing resource may store an indication of this failure and/or one or more error codes associated with the failure to generate the table.

At 408, the computing resource may transmit data associated with the attempted actions and/or other processing of the instructions received at 402 to a logging system. For example, the computing resource may transmit the actions attempted, the results of the attempts (e.g., success, failure, error codes, etc.), the session identifier associated with the instructions to perform the actions, times and/or dates of the attempts to perform the actions, and/or any other data that may be associated with attempts to perform one or more actions on a computing resources and/or instructions associated therewith. In various examples, the computing resource may also, or instead, transmit such data to an automation system, such as the automation system from which the instruction of 402 were received.

Figure 5:
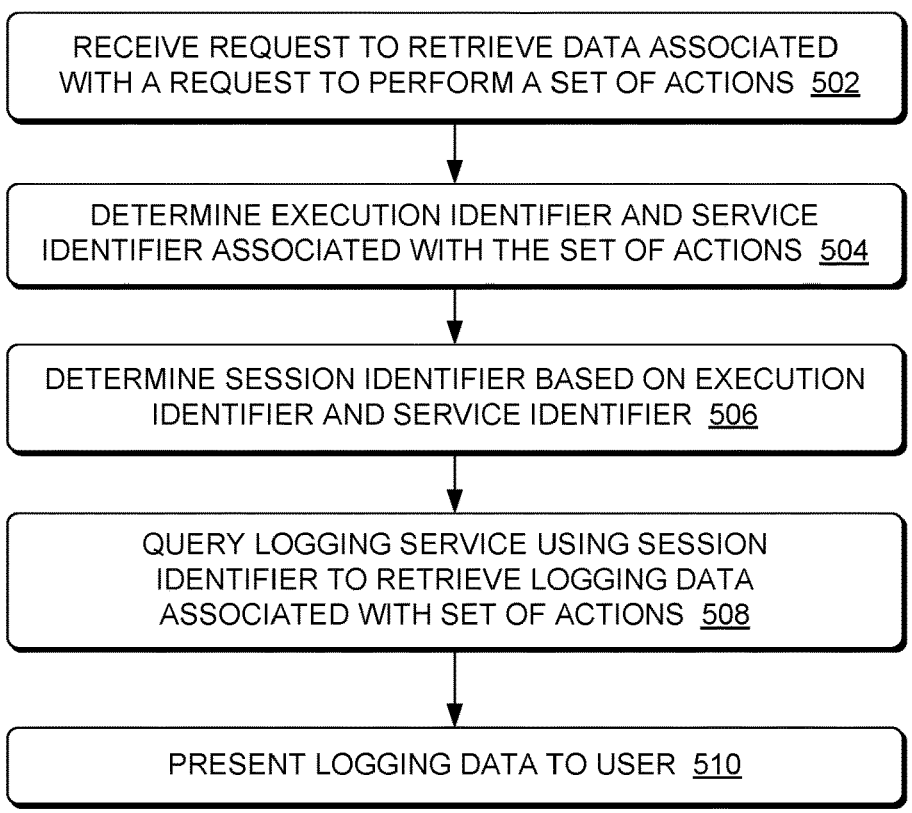
FIG. 5 illustrates a flow diagram of an example method for retrieving and presenting data associated with a set of actions.

FIG. 5 is a flow diagram of an illustrative process 500 to retrieve and present activity data associated with a session identifier (e.g., and therefore a particular change request). The process 500 may be described at times with reference to the environment 100 and may be performed by the change management system 110 and/or the logging system 130, but the process 500 may also, or instead, be performed in other similar and/or different environments by other similar and/or different systems.

At 502, a management system, for example via a management interface (e.g., GUI), portal, or console, may receive a request for data associated with a particular set of actions. For example, a change management system such as the change management system 110 may receive, via the change management interface 150, a request for activity data related to a particular change request.

At 504, the management system may determine an execution identifier and a service identifier associated with the set of action. For example, where the set of actions are associated with a change request, the management system may determine that the service identifier for a change management service and an execution identifier for the change request and/or an associated change instruction.

At 506, the management system may determine a session identifier based on the execution identifier and the service identifier. For example, the management system may append the execution identifier to the service identifier to determine the session identifier and/or may perform one or more other operations to determine the session identifier.

At 508, the management system may use the session identifier to query one or more logging systems that may be configured to store activity data for an automation system and/or one or more resources that may be associated with the set of actions indicated at 502. This query may be performed using one or more SQL database queries and/or similar queries, or any other suitable data retrieval methods. Further at 508, the management system may receive the requested data from the one or more logging systems in response to the query.

At 510, the management system may present the retrieved data to the user on, for example, a GUI. The management system may also, or instead, perform one or more operations on the retrieved data to generate additional data that may be provided to the user, such as trend data, impact location data, aggregated data, etc.

Figures 6, 7:
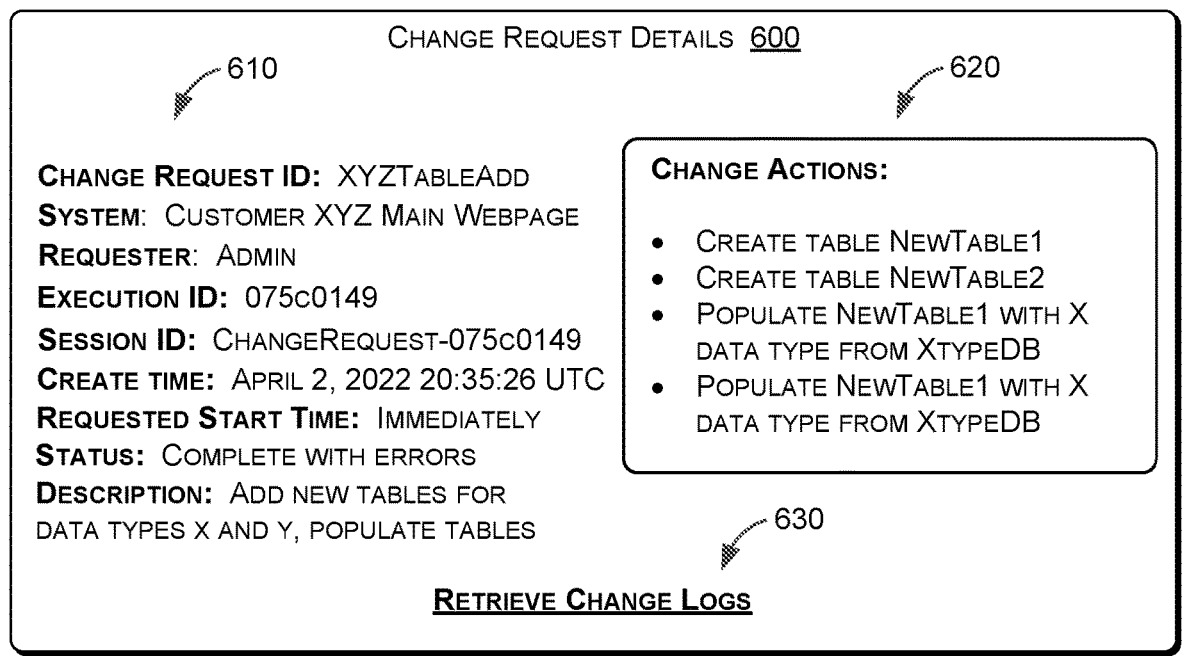
FIG. 6 illustrates a representation of a user interface that may present various example types of data that may be associated with a set of actions.
FIG. 7 illustrates a representation of a user interface that may present various example types of activity data that may be associated with a set of actions.

FIGS. 6 and 7 are representations of interfaces illustrating exemplary data, such as change activity data, that may be logged and retrieved for presentation to a user using the disclosed session identifiers and systems and methods. The interfaces described in these figures may be described at times with reference to the environment 100 and one or more of the change management system 110, the automation system 120, and the logging system 130, but the these interfaces may also, or instead, be implemented in other similar and/or different environments by other similar and/or different systems.

FIG. 6 illustrates a representative change request details interface 600. While the interface 600 may present to a user various details associated with a change request, similar interfaces may be used to present data associated with other requests or operations that involve a set of one or more actions. Any or all of the data described in regard to the interface 600 may be stored on and/or retrieved from a management system of any type (e.g., a change management system such as the change management system 110), an automation system of any type (e.g., the automation system 120), and/or a logging system (e.g., the logging system 130).

In section 610, identifying data for a change request may be presented that may include one or more of a change request identifier, a system identifier identifying the system in which computing resources affected by the change request may be configured, a requestor (e.g., requesting user), an execution identifier, a session identifier (e.g., generated based on an execution identifier and a service identifier), a create time identifying the time at which the change request was created or otherwise detected, a requested start time indicating the time at which requestor would like to change request to be implemented, a status indicating the overall outcome of the change request, and a description that may be completed by the requester to provide notes or a rationale for the change request. Any or all such data may be retrieved in response to a user requesting such data. For example, a user may select a control (e.g., a hyperlink) associated with the change request in a change management interface. In response, the change management system may retrieve the data displayed in the interface 600 from local data storage and/or from a logging system and/or automation system.

The interface 600 may also include a list of actions 620 associated with the change request. The interface 600 may further include a control 630 that may, in response to activation, generate an interface that provides details of the activity associated with the change request and, in particular, with the session identifier associated with the change request. For example, upon activation of the control 630, the change management system may generate one or more database queries that may include the session identifier associated with the change request. The change management system may transmit the one or more queries to a logging system to retrieve the activity data associated with the change request. This activity data may then be presented to the user.

For example, FIG. 7 illustrates a representative change request action logs interface 700. While the interface 700 may present to a user various details associated with change request actions, similar interfaces may be used to present data associated with other actions in a set of one or more actions that may be performed by one or more resources. Any or all of the data described in regard to the interface 700 may be stored on and/or retrieved from a management system of any type (e.g., a change management system such as the change management system 110), an automation system of any type (e.g., the automation system 120), and/or a logging system (e.g., the logging system 130).

The interface 700 may include section 710 that may identify the change request associated with the activity data included in the interface 700. The section 710 may also, or instead, identify the session identifier associated with the change request and/or one or both of the service identifier and the execution identifier on which the session identifier may be based.

The activity data shown in the interface 700 may be associated with various computing resources to which instructions were sent to perform one or more actions. For example, an automation system may have sent changes tasks to various computing resources in a customer system. The computing resources may have attempted to perform the actions and may have transmitted the results of such attempts and/or associated data to a logging system from which the data displayed in the interface 700 may have been retrieved.

For example, the interface 700 may include action data 720 that may indicate a specific action associated with each row of the data presented in the interface. The interface 700 may also, or instead, include time data 730 that may indicate a time and/or date at which the action associated with the respective row of data may have been initiated and/or completed. The interface 700 may also, or instead, include source data 740 that may indicate one or more systems or devices that originated the instructions to perform the action associated with the respective row of data (e.g., a change management system or service, an automation system or service, etc.). The interface 700 may also, or instead, include resource data 750 that may indicate a resource associated with the respective row of data (e.g., the resource instructed to perform the action in the respective row). The interface 700 may also, or instead, include status data 760 that may indicate a result of the action associated with the respective row of data (e.g., success, failure, error code, etc.).

By using the session identifier as described herein, the disclosed systems and methods provide an efficient means of retrieving activity data associated with a specific change request or other set of actions and determining the impact and scope of such actions in a complete system that may be configured with many and various computing resources.

Figure 8:
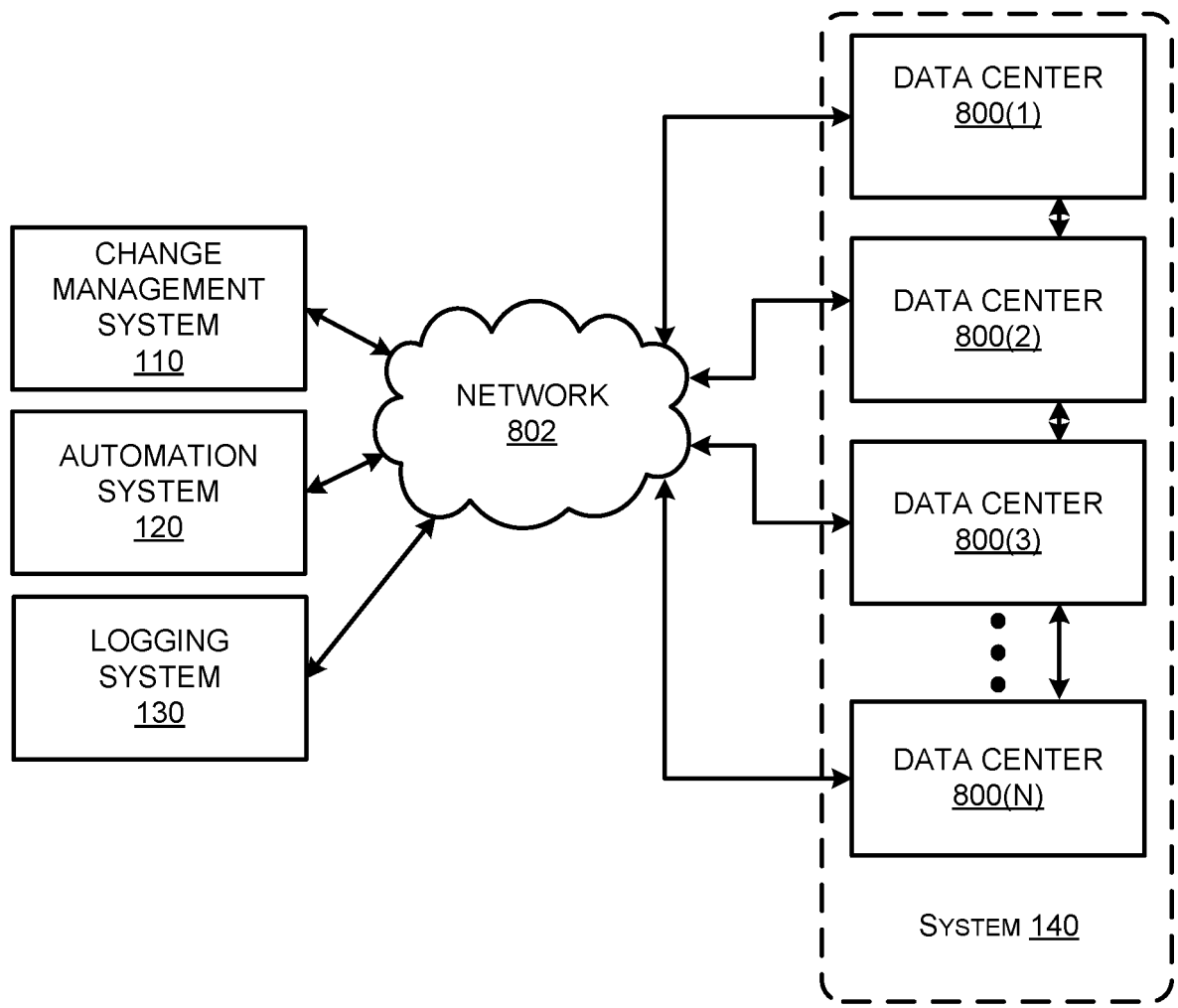
FIG. 8 is a system and network diagram that shows an illustrative operating environment that includes a system that can be configured to implement aspects of the functionality described herein.

FIG. 8 is a system and network diagram that shows an illustrative operating environment that includes a change management system 110, an automation system 120, a logging system 130, and a system 140 that can be configured to implement aspects of the functionality described herein. The system 140 can execute various types of computing and network services, such as the data storage and data processing, and/or provide computing resources for various types of systems on a permanent or an as-needed basis. Among other types of functionality, the computing resources provided by the system 140, or by a larger system of which the system is a part, such as the change management system 110, the automation system 120, and the logging system 130, can be utilized to implement the various change management, automation, and activity logging services described herein. As also discussed above, the system 140 may be part of a larger system that provides the additional computing resources that include, without limitation, data storage resources, data processing resources, such as virtual machine (VM) instances, networking resources, data communication resources, network services, and other types of resources.

Each type of computing resource provided by the system 140, or by a larger system of which the system is a part, including the change management system 110, the automation system 120, and the logging system 130, can be general-purpose or can be available in a number of specific configurations. For example, data processing resources can be available as physical computers or VM instances in a number of different configurations. The VM instances can be configured to execute applications, including web servers, application servers, media servers, database servers, some or all of the change management, automation, and logging services described above, and/or other types of programs. Data storage resources can include file storage devices, block storage devices, and the like. The system 140, or a larger system of which the system is a part, can also be configured to provide other types of computing resources not mentioned specifically herein.

The computing resources provided by system 140, or a larger system of which the system is a part, are enabled in one implementation by one or more data centers 800(1), 800(2), 800(3), . . . , 800(N). The data centers are facilities utilized to house and operate computer systems and associated components. The data centers typically include redundant and backup power, communications, cooling, and security systems. The data centers can also be located in geographically disparate locations. One illustrative configuration for a data center that can be utilized to implement the technologies disclosed herein will be described below with regard to FIG. 9.

The users of the system can access the computing resources, such as change management system 110, automation system 120, logging system 130, and/or any of the computing resources of system 140, provided by the system over a network 802, which can be a wide area communication network ("WAN"), such as the Internet, an intranet, an Internet service provider ("ISP") network, or a combination of such networks. For example, and without limitation, a computing device (e.g., the change management system 110) operated by a user of the system can be utilized to access the system by way of the network 802. It should be appreciated that a local-area network ("LAN"), the Internet, or any other networking topology known in the art that connects the data centers to remote users and other users can be utilized. It should also be appreciated that combinations of such networks can also be utilized.

Figure 9:
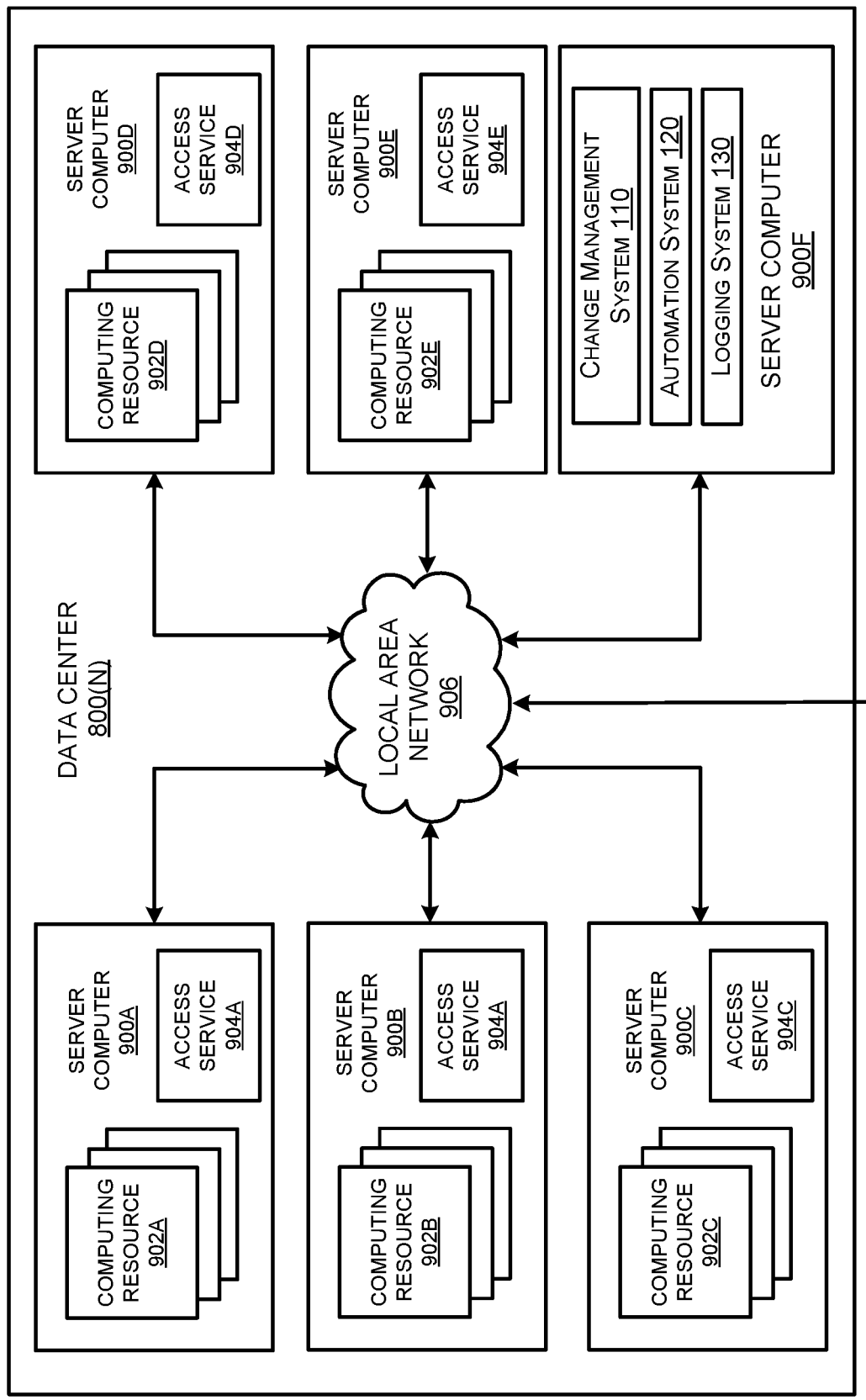
FIG. 9 is a computing system diagram illustrating a configuration for a data center that can be utilized to implement aspects of the technologies disclosed herein.

FIG. 9 is a computing system diagram that illustrates one configuration for a data center 800(N) that can be utilized to implement the system 140, the change management system 110, the automation system 120, and/or the logging system 130, as described above in FIGS. 1-7 and/or any other change management, automation, and logging services disclosed herein, such as the computing resources 114. The example data center 800(N) shown in FIG. 9 includes several server computers 900A-900E (collectively 900) for providing the computing resources 902A-902E (collectively 902), respectively.

The server computers 900 can be standard tower, rackmount, or blade server computers configured appropriately for providing the various computing resources described herein (illustrated in FIG. 9 as the computing resources 902A-902E). As mentioned above, the computing resources 902 provided by the system 140, or a larger system of which the system is a part, can include, without limitation, analytics applications, data storage resources, data processing resources such as VM instances or hardware computing systems, database resources, networking resources, and others. Some of the servers 900 can also be configured to execute access services 904A-904E (collectively 904) capable of instantiating, providing and/or managing the computing resources 902, some of which are described in detail herein.

The data center 800(N) shown in FIG. 9 also includes a server computer 900F that can execute some or all of the software components described above. For example, and without limitation, the server computer 900F can be configured to execute one or more of the change management system 110, the automation system 120, and the logging system 130. The server computer 900F can also be configured to execute other components and/or to store data for providing some or all of the functionality described herein. In this regard, it should be appreciated that components or different instances of one or more of the change management system 110, the automation system 120, and the logging system 130 can execute on many other physical or virtual servers in the data centers 800 in various configurations.

In the example data center 800(N) shown in FIG. 9, an appropriate LAN 906 is also utilized to interconnect the server computers 900A-900F. The LAN 906 is also connected to the network 802 illustrated in FIG. 8. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 800(1)-(N), between each of the server computers 900A-900F in each data center 800, and, potentially, between computing resources 902 in each of the data centers 800. It should be appreciated that the configuration of the data center 800 described with reference to FIG. 9 is merely illustrative and that other implementations can be utilized.

Figure 10:
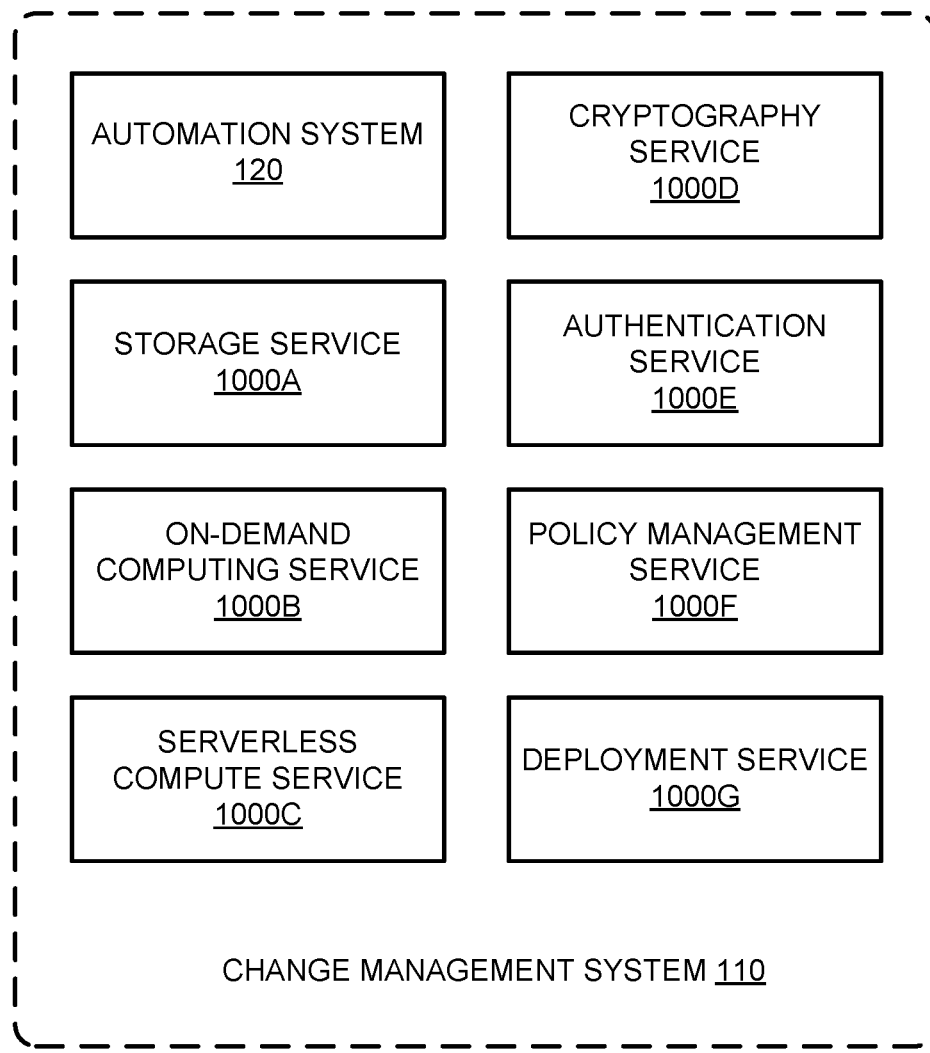
FIG. 10 is a network services diagram that shows aspects of several services that can be provided by and utilized within a system, or a larger system of which the system is a part, which is configured to implement the various technologies disclosed herein.

FIG. 10 is a system services diagram that shows aspects of several services that can be provided by and utilized within the change management system 110, the system 140, and/or a larger system of which these systems may be a part, which is configured to implement the various technologies disclosed herein. In particular, and as discussed above, the system, or a larger system of which the system is a part, can provide a variety of services to users and other users including, but not limited to, the automation system 120 and/or a computing instance performing one or more functions thereof, a storage service 1000A that may include the logging system 130 and/or a computing instance performing one or more functions thereof, an on-demand computing service 1000B, a serverless compute service 1000C, a cryptography service 1000D, an authentication service 1000E, a policy management service 1000F, and a deployment service 1000G. The system, or a larger system of which the system is a part, can also provide other types of computing services, some of which are described below.

It is also noted that not all configurations described include the services shown in FIG. 10 and that additional services can be provided in addition to, or as an alternative to, the services explicitly described herein. Each of the systems and services shown in FIG. 10 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 10 will now be provided.

The storage service 1000A can be a network-based storage service that stores data obtained from users of the system and/or from computing resources in the system, or a larger system of which the system is a part. The data stored by the storage service 1000A can be obtained from computing devices of users. The data stored by the storage service 1000A may also be activity data logged to the storage system 1000A that may be functioning as a logging system or service, such as the logging system 130.

The on-demand computing service 1000B can be a collection of computing resources configured to instantiate VM instances and to provide other types of computing resources on demand. For example, a user of the system, or a larger system of which the system is a part, can interact with the on-demand computing service 1000B (via appropriately configured and authenticated API calls, for example) to provision and operate VM instances that are instantiated on physical computing devices hosted and operated by the system, or a larger system of which the system is a part. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 1000B is shown in FIG. 10, any other computer system or computer system service can be utilized in the system, or a larger system of which the system is a part, to implement the functionality disclosed herein, such as a computer system or computer system service that does not employ virtualization and instead provisions computing resources on dedicated or shared computers/servers and/or other physical devices.

The serverless compute service 1000C is a network service that allows users to execute code (which might be referred to herein as a "function") without provisioning or managing server computers in the system, or a larger system of which the system is a part. Rather, the serverless compute service 1000C can automatically run code in response to the occurrence of events. The code that is executed can be stored by the storage service 1000A or in another network accessible location.

In this regard, it is to be appreciated that the term "serverless compute service" as used herein is not intended to infer that servers are not utilized to execute the program code, but rather that the serverless compute service 1000C enables code to be executed without requiring a user to provision or manage server computers. The serverless compute service 1000C executes program code only when needed, and only utilizes the resources necessary to execute the code. In some configurations, the user or entity requesting execution of the code might be charged only for the amount of time required for each execution of their program code.

The system, or a larger system of which the system is a part, can also include a cryptography service 1000D. The cryptography service 1000D can utilize storage services of the system, or a larger system of which the system is a part, such as the storage service 1000A, to store encryption keys in encrypted form, whereby the keys can be usable to decrypt user keys accessible only to particular devices of the cryptography service 1000D. The cryptography service 1000D can also provide other types of functionality not specifically mentioned herein.

The system, or a larger system of which the system is a part, in various configurations, also includes an authentication service 1000E and a policy management service 1000F. The authentication service 1000E, in one example, is a computer system (i.e., collection of computing resources 1000B) configured to perform operations involved in authentication of users or customers. For instance, one of the services shown in FIG. 10 can provide information from a user or customer to the authentication service 1000E to receive information in return that indicates whether or not the requests submitted by the user or the customer are authentic.

The policy management service 1000F, in one example, is a network service configured to manage policies on behalf of users or customers of the system, or a larger system of which the system is a part. The policy management service 1000F can include an interface (e.g. API or GUI) that enables customers to submit requests related to the management of policy, such as a security policy. Such requests can, for instance, be requests to add, delete, change, or otherwise modify policy for a customer, service, or system, or for other administrative actions, such as providing an inventory of existing policies and the like.

The system, or a larger system of which the system is a part, can additionally maintain other network services based, at least in part, on the needs of its customers. For instance, the system, or a larger system of which the system is a part, can maintain a deployment service 1000G for deploying program code in some configurations. The deployment service 1000G provides functionality for deploying program code, such as to virtual or physical hosts provided by the on-demand computing service 1000B. Other services include, but are not limited to, database services, object-level archival data storage services, and services that manage, monitor, interact with, or support other services. The system, or a larger system of which the system is a part, can also be configured with other network services not specifically mentioned herein in other configurations.

Figure 11:
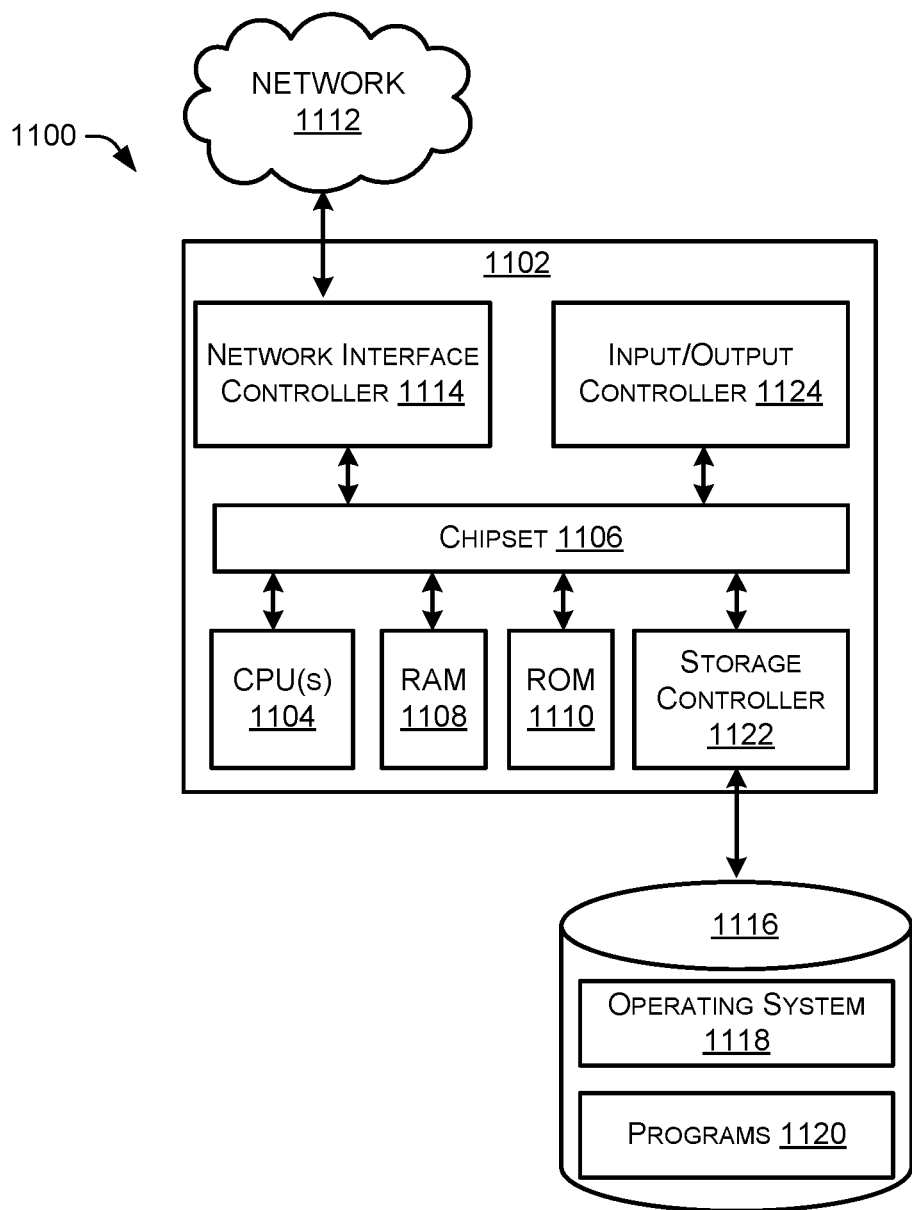
FIG. 11 is a computer architecture diagram showing an illustrative computer hardware architecture for implementing a computing device that can be utilized to implement aspects of the various technologies presented herein.

FIG. 11 shows an example computer architecture for a computer 1100 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein. The computer 1100 may represent architecture for a naming service, a concentrator, a reader, and/or other devices described herein.

The computer 1100 includes a baseboard 1102, or "motherboard," which may be one or more printed circuit boards to which a multitude of components and/or devices may be connected by way of a system bus and/or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network, such as the network 1112. The chipset 1106 can include functionality for providing network connectivity through a NIC 1114, such as a gigabit Ethernet adapter. The NIC 1114 is capable of connecting the computer 1100 to other computing devices over the network 1112. It should be appreciated that multiple NICs 1114 can be present in the computer 1100, connecting the computer to other types of networks and remote computer systems.

The computer 1100 can be connected to a mass storage device 1116 that provides non-volatile storage for the computer. The mass storage device 1116 can store an operating system 1118, programs 1120, and data, which have been described in greater detail herein. The mass storage device 1116 can be connected to the computer 1100 through a storage controller 1122 connected to the chipset 1106. The mass storage device 1116 can consist of one or more physical storage units. The storage controller 1122 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 can store data on the mass storage device 1116 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1116 is characterized as primary or secondary storage, and the like.

For example, the computer 1100 can store information to the mass storage device 1116 by issuing instructions through the storage controller 1122 to alter the magnetic characteristics of a particular location within a magnetic disk drive unit, the reflective or refractive characteristics of a particular unit in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the mass storage device 1116 by detecting the physical states or characteristics of one or more particular locations within the physical storage units.

In addition to the mass storage device 1116 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned above, the mass storage device 1116 can store an operating system 1118 utilized to control the operation of the computer 1100. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1116 can store other system or application programs and data utilized by the computer 1100.

In one configuration, the mass storage device 1116 or other computer-readable storage media is encoded with computer-executable instructions which, when loaded into the computer 1100, transform the computer from a general-purpose computing system into a special-purpose computer capable of implementing the configurations described herein. These computer-executable instructions transform the computer 1100 by specifying how the CPUs 1104 transition between states, as described above. According to one configuration, the computer 1100 has access to computer-readable storage media storing computer-executable instructions which, when executed by the computer 1100, perform the various processes described above. The computer 1100 can also include computer-readable storage media for performing any of the other computer-implemented operations described herein.

The computer 1100 can also include one or more input/output controllers 1124 for receiving and processing input from a number of input devices, such as a keyboard, a mouse, a touchpad, a touch screen, an electronic stylus, or other type of input device. Similarly, an input/output controller 1124 can provide output to a display, such as a computer monitor, a flat-panel display, a digital projector, a printer, or other type of output device. It will be appreciated that the computer 1100 might not include all of the components shown in FIG. 11, can include other components that are not explicitly shown in FIG. 11, or can utilize an architecture completely different than that shown in FIG. 11.

Based on the foregoing, it should be appreciated that technologies for providing closed loop change management services and sorting and retrieving activity data based on a session identifier have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A method comprising:
   receiving, at an automation system from a change management system, a change instruction associated with a change request, the change instruction comprising one or more actions;
   determining, by the automation system, an execution identifier associated with a change management workflow associated with the change instruction;
   determining, by the automation system, a service identifier associated with a change management service that generated the change instruction;
   generating, by the automation system, a change session identifier using the execution identifier and the service identifier, the change session identifier identifying computing resource configuration change data associated with the one or more actions;
   determining, by the automation system and based on the change instruction, one or more computing resources that perform at least one of data processing operations or data storage operations;
   transmitting, by the automation system to the one or more computing resources, an instruction to perform at least one of the one or more actions, the instruction comprising the change session identifier; and
   transmitting, by the automation system to a logging system that stores the computing resource configuration change data, data associated with the instruction and comprising the change session identifier.

2. The method of claim 1, further comprising:
   receiving, at the change management system, a request for the computing resource configuration change data associated with the change request;
   determining, by the change management system and based on the change request, the execution identifier and the service identifier;
   determining, by the change management system and based on the execution identifier and the service identifier, the change session identifier;
   generating, by the change management system, a query for the computing resource configuration change data comprising the change session identifier;
   retrieving, by the change management system from the logging system, the computing resource configuration change data using the query; and
   presenting, by the change management system on a graphical user interface, the computing resource configuration change data.

3. The method of claim 1, further comprising:
   receiving, at a computing resource of the one or more computing resources, the instruction;
   initiating, by the computing resource, the at least one of the one or more actions;
   determining, by the computing resource, a status of the at least one of the one or more actions; and
   transmitting, by the computing resource to the logging system, second data associated with the at least one of the one or more actions and comprising the change session identifier and the status.

4. A method comprising:
   receiving, at an automation system from a management system, a system modification instruction comprising an action;
   determining, by the automation system, an execution identifier associated with a workflow associated with the system modification instruction and an automation service identifier associated with an automation service associated with the automation system, wherein the automation service generated the system modification instruction;
   determining, by the automation system, a session identifier based at least in part on the execution identifier and the automation service identifier;
   transmitting, by the automation system to a computing resource, an instruction to perform the action, the instruction comprising the session identifier;
   transmitting, to a logging system, computing resource configuration modification data based at least in part on the instruction to perform the action; and
   associating, at the logging system, the session identifier with the computing resource configuration modification data.

5. The method of claim 4, wherein determining the session identifier comprises appending the execution identifier to the automation service identifier.

6. The method of claim 4, wherein the action comprises one or more of removing one or more computing resources from a system or adding one or more computing resources to the system.

7. The method of claim 4, further comprising:
   determining a type of data associated with one or more operations to be performed on the computing resource associated with the action; and
   determining the computing resource based at least in part on the type of data.

8. The method of claim 4, further comprising:
receiving, at the automation system from the computing resource, the computing resource configuration modification data, wherein the computing resource configuration modification data comprises an indication of a result of attempting to perform the action at the computing resource.

9. The method of claim 8, wherein the computing resource configuration modification data comprises one or more indications of one or more of:
initiation of the action;
time of initiation of the action;
completion of the action;
time of completion of the action;
failure to complete the action; or
one or more errors codes associated with the action.

10. The method of claim 4, further comprising:
determining a type of one or more operations to be performed on the computing resource based at least in part on the action; and
determining the computing resource based at least in part on the type of the one or more operations.

11. The method of claim 4, wherein transmitting the instruction to the computing resource comprises causing the computing resource to:
initiate the action;
determine a status of the action; and
transmit data to a logging system indicating the action, the status, and the session identifier.

12. The method of claim 4, further comprising:
receiving a request for the computing resource configuration modification data associated with the system modification instruction;
determining the execution identifier and the automation service identifier based at least in part on the request;
determining the session identifier based at least in part on the execution identifier and the automation service identifier;
determining the computing resource configuration modification data associated with the session identifier; and
retrieving the computing resource configuration modification data.

13. The method of claim 4, wherein the action is based at least in part on activation of a control on a change request interface.

14. A system comprising:
one or more processors; and
one or more computer-readable media storing computer-executable instructions that, when executed by the one or more processors, cause a management system component to perform operations comprising:
receiving, at a management system, a request for activity data associated with an action initiated at a computing resource;
determining, by the management system and based at least in part on the request, an execution identifier associated with a workflow associated with the action and a service identifier associated with a change management service associated with the management system, wherein the change management service generated an instruction to initiate the action at the computing resource;
determining, by the management system and based at least in part on the execution identifier and the service identifier, a session identifier;
retrieving, by the management system from a logging system, the activity data using a query comprising the session identifier; and
presenting, by the management system on a graphical user interface, the activity data.

15. The system of claim 14, wherein the activity data comprises one or more of:
an action identifier;
an action initiation time;
an action completion time;
a source of the instruction to initiate the action;
a status of the action;
a computing resource identifier; or
one or more error codes associated with the action.

16. The system of claim 14, wherein determining the execution identifier comprises determining the workflow during which the instruction to initiate the action was generated.

17. The system of claim 14, wherein the action comprises one or more of removing one or more first computing resources from a second system or adding one or more second computing resources to the second system.

18. The system of claim 14, wherein the session identifier is determined by an automation service associated with an automation system associated with the management system.

19. The system of claim 14, wherein the operations further comprise:
detecting activation of a control on a change request interface; and
based at least in part on detecting the activation of the control:
determining the action; an
generating the request comprising an indication of the action.

20. The system of claim 19, wherein determining the action comprises determining a change request identifier associated with a change request comprising the action.

* * * * *